(12) United States Patent
McKinlay

(10) Patent No.: US 6,343,688 B1
(45) Date of Patent: Feb. 5, 2002

(54) CONVEYOR AND ESCALATOR FOR TRANSPORTING EGGS AND THE LIKE

(76) Inventor: Bruce Archibald McKinlay, R.R. #3, Ridgetown, Ontario (CA), N0P 2C0

(*) Notice: Subject to any disclaimer, the term of this patent is extended or adjusted under 35 U.S.C. 154(b) by 0 days.

(21) Appl. No.: 09/485,510
(22) PCT Filed: Aug. 18, 1998
(86) PCT No.: PCT/CA98/00785
 § 371 Date: Feb. 11, 2000
 § 102(e) Date: Feb. 11, 2000
(87) PCT Pub. No.: WO99/08946
 PCT Pub. Date: Feb. 25, 1999

Related U.S. Application Data

(60) Provisional application No. 60/055,988, filed on Aug. 18, 1997.

(51) Int. Cl.[7] .................................................. B65G 47/84
(52) U.S. Cl. .................................... 198/803.13; 119/337
(58) Field of Search ........................ 198/484.1, 803.13; 119/337

(56) References Cited

U.S. PATENT DOCUMENTS

| | | | |
|---|---|---|---|
| 3,166,175 A | | 1/1965 | Kurtz et al. |
| 3,286,619 A | * | 11/1966 | Lee .......................... 198/803.13 |
| 3,568,816 A | * | 3/1971 | Smith et al. .............. 198/484.1 |
| 3,672,485 A | | 6/1972 | Walters |
| 3,770,104 A | * | 11/1973 | Reimers ................. 198/803.13 |
| 5,365,717 A | | 11/1994 | McKinlay |

* cited by examiner

Primary Examiner—Joseph E. Valenza

(74) Attorney, Agent, or Firm—Arne I. Fors

(57) ABSTRACT

A conveyor and escalator for transporting objects having a substantially uniform size and length such as eggs horizontally, vertically and helically vertically comprising at least one flexible endless support means; a drive means operably engaging said flexible endless support means for driving said flexible endless support means in a direction of advance; and a plurality of equispaced elongated paddles attached substantially perpendicular to said flexible endless support means, said paddles being adapted to support an object during linear travel and to open for receiving or releasing said object therebetween during arcuate travel. The endless flexible support means comprises an endless chain, an endless belt or an endless cable. Preferably, the endless flexible support means comprises a pair or parallel spaced-apart endless chains and at least two linearly-spaced sprocket wheels engaging each said endless chain for supporting said chain in linear travel between the sprocket wheels and in arcuate travel about said sprocket wheels, and means for rotating said sprocket wheels for advancing the endless chains. The elongated paddles may have an I-section with means at opposite ends of the I-section for removably connecting said paddles at said opposite ends to the endless chains transversely to the said direction of advance whereby the paddles remain vertically upright during horizontal linear travel to support objects on adjacent upper flanges and whereby the paddles pivot relative to each other about a longitudinal central axis during arcuate travel to open adjacent paddles at the upper flanges to receive objects therebetween during downward arcuate travel and to open adjacent paddles at adjacent lower flanges to discharge objects therefrom during upward arcuate travel. The paddles optionally may have an I-shaped cross-section, a C-shaped cross-section, a Z-shaped cross-section, an inverted J-shaped cross-section, an inverted T-shaped cross-section or an inverted 7-shaped cross-section.

1 Claim, 13 Drawing Sheets

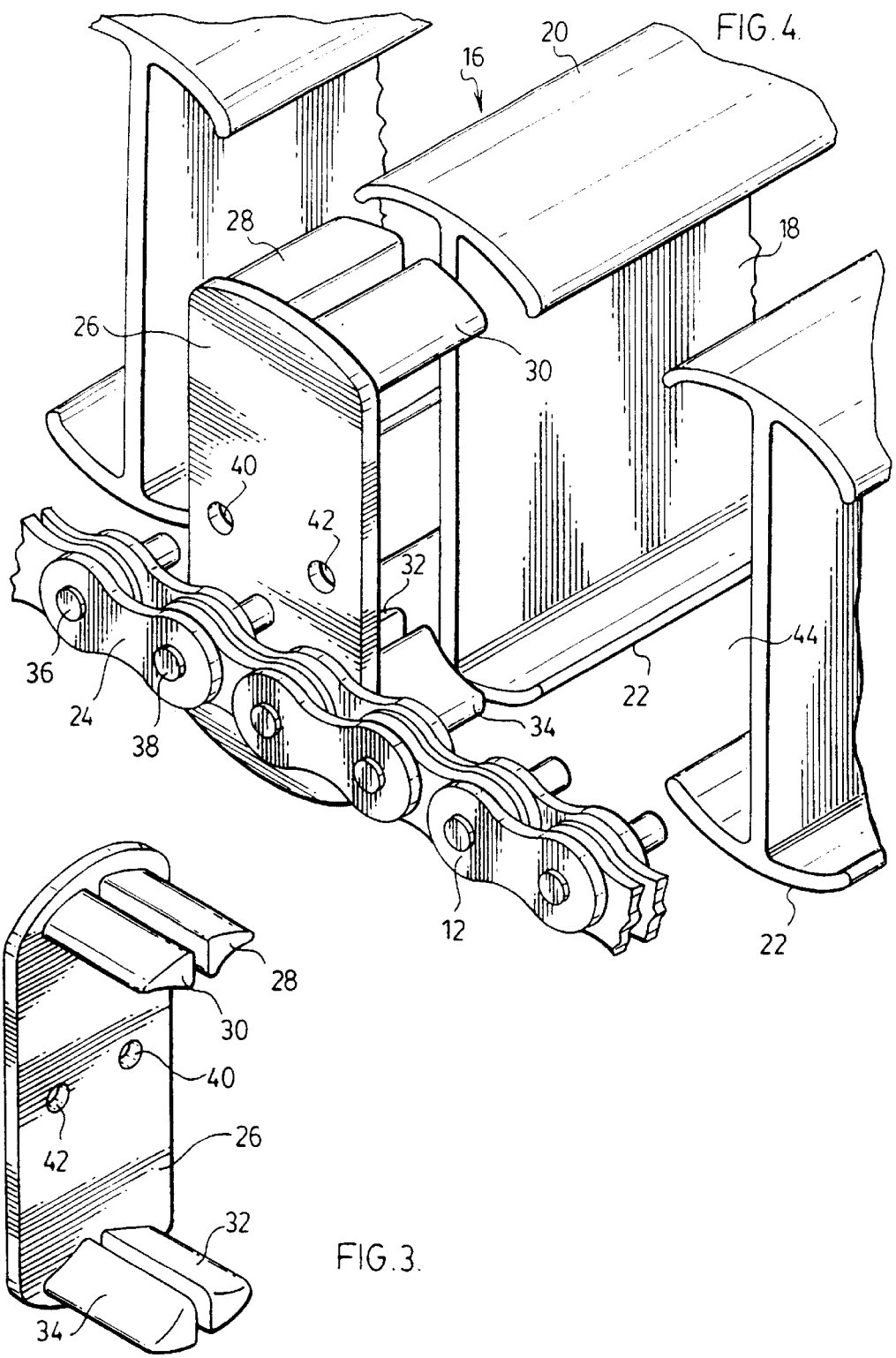

CONVEYOR AND ESCALATOR FOR TRANSPORTING EGGS AND THE LIKE

This application is a 371 of PCT/CA98/00785 filed Aug. 18, 1998, which claims benefit to Provisional application Ser. No. 60/055988 filed Aug. 18, 1997.

(i) Field of the Invention

This invention relates to a method and apparatus for transporting a plurality of like objects having a substantially uniform size and, more particularly, relates to a method and a conveyor and escalator apparatus for transporting eggs and the like objects.

(ii) Description of the Related Art

Egg conveyors form an essential element in a typical egg collection apparatus. A typical egg collection system has a main conveyor for receiving eggs from a nest ancillary conveyors for delivering the eggs for further processing, and a packing machine for packaging the eggs.

Transferring the eggs between different handling apparatus involves a succession of transfer points with each successive transfer point increasing the likelihood of damage to the eggs, which can significantly decrease the productivity of the operation. Present systems involve numerous transfer points because of the number of different handling apparatus.

The conveyors of the prior art systems rely on gravity to retain the eggs on the conveyor surface. In order to change the direction or elevation of the egg path, the eggs must be transferred to an elevator or inclined belt conveyor, and then usually transferred back to another conveyor, not only increasing the number of transfer points and risk of damage to the eggs but also requiring a large working space in which to handle the eggs.

U.S. Pat. No. 5,279,254 (Dowty) issued Jan. 18, 1994, U.S. Pat. No. 4,345,682 (White et al.) issued Aug. 24, 1992, U.S. Pat. No. 3,672,485 (Walters) issued Jun. 27, 1972, U.S. Pat. No. 3,626,905 (Mombris et al.) issued Dec. 14, 1971, U.S. Pat. No. 3,166,175 (Kurtz et al.) issued Jan. 19, 1965, and Canadian Patent Application Serial No. 2,002,588 laid open on May 11, 1990, disclose egg collecting systems having a conveyor belt for transferring eggs to an elevator which transfers eggs to a cross-conveyor.

U.S. Pat. No. 5,365,717 (McKinlay) issued Nov. 22, 1994 discloses open baskets mounted on a continuous conveyor which move from an upright loading position to an inverted unloading position for discharge into a loading chute and delivery into egg flats. U.S. Pat. No. 3,166,175 (Kurtz et al.) issued Jan. 19, 1965 discloses an egg collection and elevator conveyor system which comprises egg flights consisting of equispaced parallel bars forming elongated open pockets which support eggs thereon by rearwardly tilting of the open pockets on an elevator and which discharge eggs by forwardly tilting the pockets downwardly.

All these patents use multiple conveyor systems in combination with elevator systems for transferring eggs between conveyors located at different elevations. These systems have an increased likelihood of damage to the eggs because of the plurality of transfer points between the different handling apparatus. Additionally, these systems are relatively complex and thus expensive to manufacture and to maintain.

SUMMARY AND OBJECTS OF THE INVENTION

The disadvantages of the prior art may be substantially overcome by providing a novel conveyor and escalator for transporting eggs and the like which obviates or mitigates at least one disadvantage of the prior art.

It is a principal object of the invention to provide a conveyor and escalator for transporting objects having a substantially uniform size and shape, such as chicken eggs, with a minimum of transfer points in a reduced working space.

Another object of the invention is the provision of a conveyor and escalator which can elevate eggs vertically upwardly or downwardly from one level to another and can change the direction of travel of the eggs during vertical travel.

A further object of the invention is to provide a conveyor and escalator that is relatively simple in construction, inexpensive to maintain, and substantially trouble-free in operation to safely transport eggs with minimum breakage.

According to a first aspect of the present invention, there is provided a conveyor system for transporting like objects having a substantially uniform size and shape. The conveyor system may have a pair of endless chains mounted in a spaced parallel relation with each other with a drive operably engaging the endless chains for synchronously driving the endless chains. A plurality of spaced paddles are rigidly connected to and extend between the endless chains. The paddles are equi-spaced for defining a receiving volume therebetween with adjacent upper and lower supports for receiving and supporting like objects. The paddles have a closed condition when travelling substantially linearly and an open condition when travelling arcuately, urging the adjacent upper supports to move apart allowing the like objects to pass therebetween into the receiving volume during downward arcuate travel and urging the adjacent lower supports to move apart allowing the like objects to pass therebetween out of the receiving volume. A plate preferably is selectively placed to cooperate with the spaced paddles for closing the receiving volume to retain like objects within the receiving volume when the paddles are travelling arcuately in an inverted condition.

In its broad aspect, the conveyor and escalator for transporting objects having a substantially uniform size and length comprises at least one flexible endless support means; a drive means operably engaging said flexible endless support means for driving said flexible endless support means in a direction of advance; and a plurality of equispaced elongated paddles attached substantially perpendicular to said flexible endless support means, for defining a receiving volume therebetween which closes during linear travel to contain an object in the receiving volume or support the object on the paddles, and which opens during arcuate travel to receive or release an object contained in the receiving volume or supported on the paddles. The endless flexible support means comprises an endless chain, an endless belt or an endless cable. The endless flexible support means preferably comprises a pair of parallel spaced-apart endless chains and at least two linearly-spaced sprocket wheels engaging each said endless chain for supporting said chain in linear travel between the sprocket wheels and in arcuate travel about said sprocket wheels, and means for rotating said sprocket wheels for advancing the endless chains.

Preferably said elongated paddles have an I-section and means at opposite ends of the I-section for removably connecting said paddles at said opposite ends to the endless chains transversely to the said direction of advance. Each paddle comprises an elongated web having longitudinal side edges and a flange having an inner face attached centrally along said face to each longitudinal edge of the web to form an I-section having a longitudinal central axis, means at opposite ends of the I-section for removably connecting said paddles at opposite ends to the endless chains at said longitudinal central axis transversely to the endless chains and perpendicular to the endless chains whereby the paddles remain vertically upright during horizontal linear travel to support objects on adjacent upper flanges and whereby the paddles pivot relative to each other about said longitudinal central axis during arcuate travel to open adjacent paddles at the upper flanges to receive objects therebetween during downward arcuate travel and to open adjacent paddles at adjacent lower flanges to discharge objects therefrom during upward arcuate travel. Each paddle may comprise an elongated web having an arcuate flange with a concave inner face attached centrally along each said face to said longitudinal edge of the web to form an I-section having a longitudinal central axis, and an end plate having a pair or upstanding spaced-apart fingers at each end adapted to receive the paddle web therebetween and to engage the concave inner face of the adjacent arcuate flange, and means formed centrally on the end plates for rigidly connecting each of the end plate transversely to the endless chains perpendicular thereto.

The paddles optionally may have a C-shaped cross-section, a Z-shaped cross-section, an inverted J-shaped cross-section, or an inverted T-shaped cross-section or an inverted 7-shaped cross-section.

DESCRIPTION OF THE DRAWINGS

The method and apparatus of the invention will now be described with reference to the accompanying drawings, in which:

FIG. 3 is a perspective view of an end connector plate of the present invention;

FIG. 4 is an exploded perspective view of an embodiment of paddle of the present invention with end plate preparatory to securement to an endless chain;

DETAILED DESCRIPTION OF THE INVENTION

Figure 1:
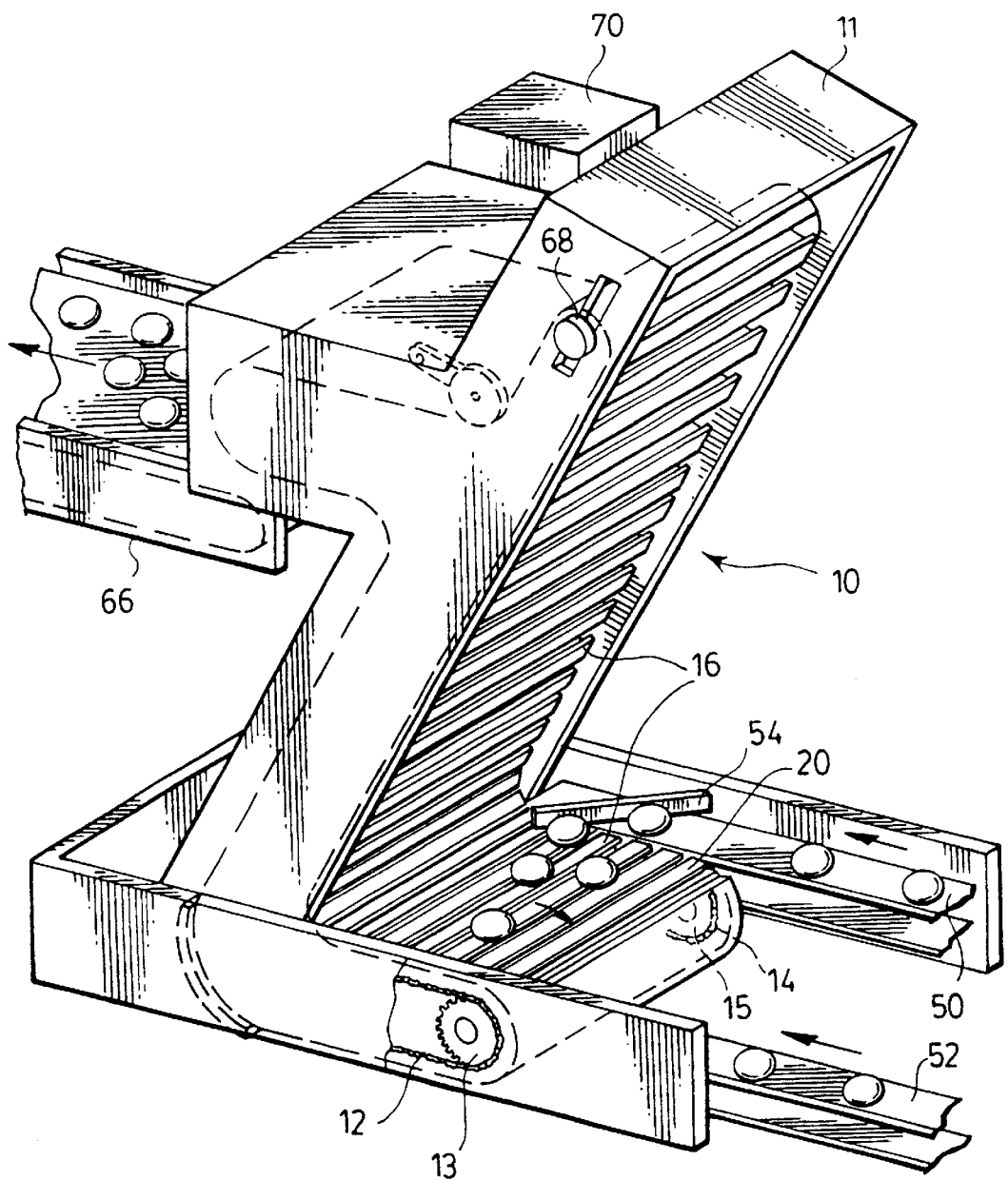
FIG. 1 is a perspective view, partly schematic, illustrating an embodiment of the conveyor and escalator of the present invention.
Figure 2:
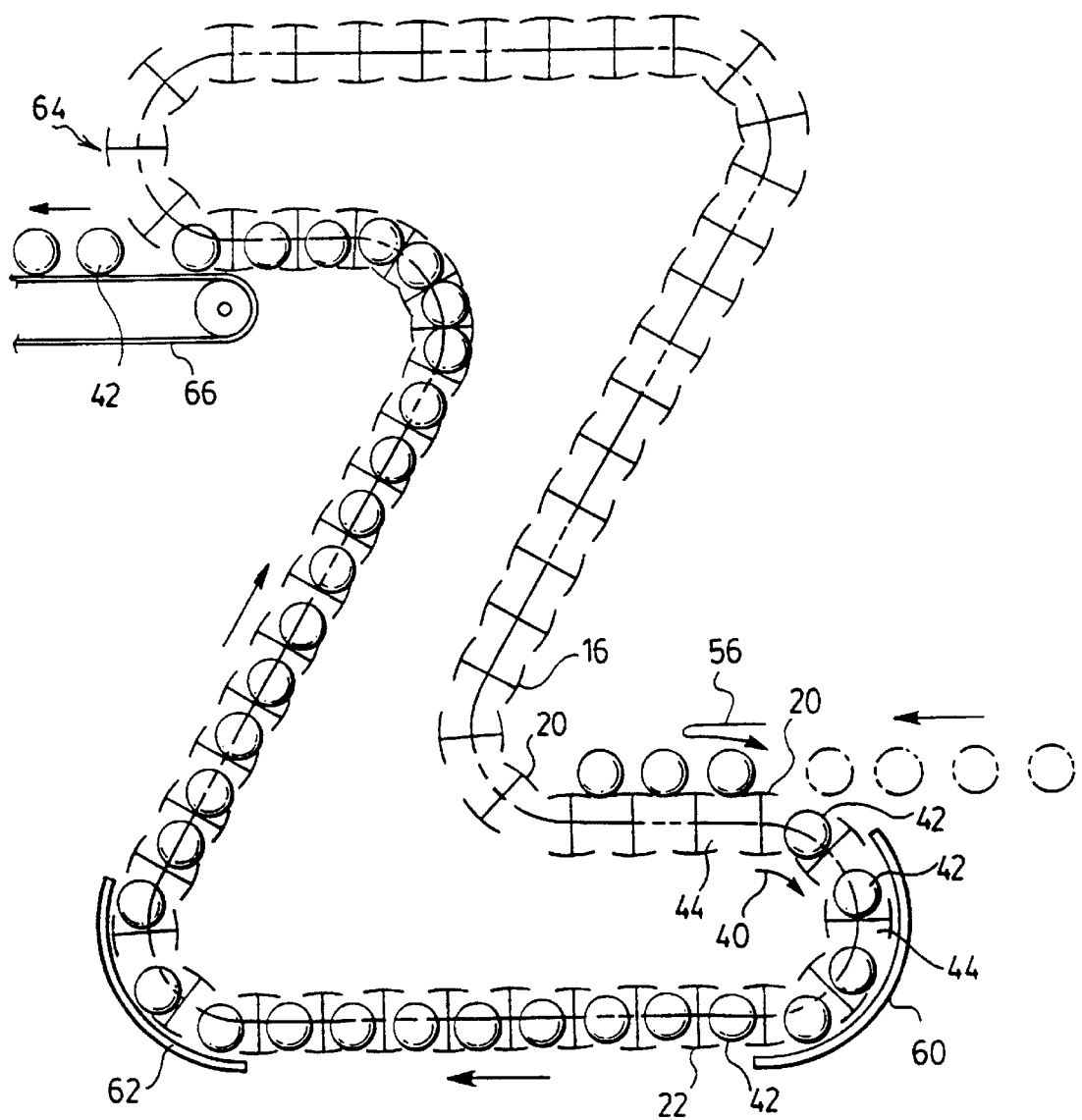
FIG. 2 is a schematic side elevation view of the embodiment of the invention shown in FIG. 1 illustrating the method of operation thereof.

An embodiment of conveyor and escalator system in accordance with the present invention is indicated generally at 10 in FIGS. 1 and 2. Conveyor and escalator system 10 comprises an enclosed metal housing 11 having two parallel extending chains 12 and 14 mounted for continuous travel about a plurality of sprockets 13, 15, two of which are shown, in an endless path. Chains 12 and 14 can have any orientation, provided each remains substantially parallel to the other. As is apparent, the chains 12 and 14 can travel vertically, horizontally and, as will be described, in a cylindrical helix pattern. Also, the conveyor can be turned on its side once loaded, to convey objects in a vertical plane, by orienting one chain above the other.

Extending perpendicular to the chains 12 and 14 and secured thereto are a plurality of equispaced paddles 16. The number of spaced paddles 16 will depend on the lengths of the chains 12 and 14, there being a sufficient number to present a continuous stream of spaced-apart paddles 16 without interruption.

Paddles 16 are generally I-shaped in cross section. As shown more clearly in FIGS. 3 and 4, each I-shaped paddle has a central web 18 and upper and lower flanges 20, 22 respectively joined to the web along opposite edges thereof such as by co-extrusion of a plastic material or light metal or steel. Each paddle is rigidly secured at its opposite ends to a link 24 of endless chain 12 by end plate 26 having a pair of spaced-apart upstanding fingers 28, 30 at one end and a pair of spaced-apart upstanding fingers 32, 34 at the opposite end for receiving paddle web 18 therebetween and for underlying and abutting flanges 20, 22. A pair of rivets 36, 38 inserted into end plate holes 40, 42 tie the assembly together to maintain each paddle 16 perpendicular to its respective chain link 24 and equally spaced from adjacent paddles.

The paddles 16 are equispaced along the chains 12 and 14 such that adjacent flanges 20, 22 of adjacent paddles 16 are spaced apart less than the size, i.e, width of an object such as an egg. As a result, when the paddles are travelling linearly, adjacent paddles 16 will support an egg on top of the upper flanges 20. As the chains 12 and 14 travel downwardly about an outside turn, the upper flanges 20 of paddles 16 will be urged apart, allowing an object which was previously supported on top of paddles 16 to fall into and be received between adjacent paddles 16 into a receiving cavity 44 defined between paddle webs 18. The flanges 22 at the lower ends of paddles 16 will be directed together presenting an egg receiving area which will support and cradle the egg as it drops down between the adjacent paddles 16.

Returning now to FIGS. 1 and 2, eggs 42 from side belt conveyors 50, 52 travelling from right to left are deflected onto upper flanges 20 of paddles 16 of conveyor 10 by deflectors 54, one of which is shown, for travel on flanges 20 in the direction designated by arrow 56 (FIG. 2). Upon downward arcuate travel over sprocket 13 (FIG. 1), upper flanges 20 are urged apart to allow eggs 42 to fall into receiving cavity 44 to be supported by lower flanges 22.

Semi-circular plate 60 prevents accidental release of an egg from the conveyor at the bottom of the turn. Eggs are conveyed to the left and turned upwardly through about 120° with semi-circular plate 62 preventing release of the eggs. The conveyor is then turned through about 70° to the horizontal and eggs 42 subsequently released by turning the conveyor through upward arcuate travel at 64. Eggs 42 are gently discharged onto belt conveyor 66 and removed. The endless conveyor returns to the right as viewed in FIGS. 1 and 2 for return to the egg loading area. FIG. 1 additionally shows an upper vertical adjustment 68 for adjusting the tension of chains 12, 14. A drive motor 70 is connected to drive sprockets.

Figure 5:
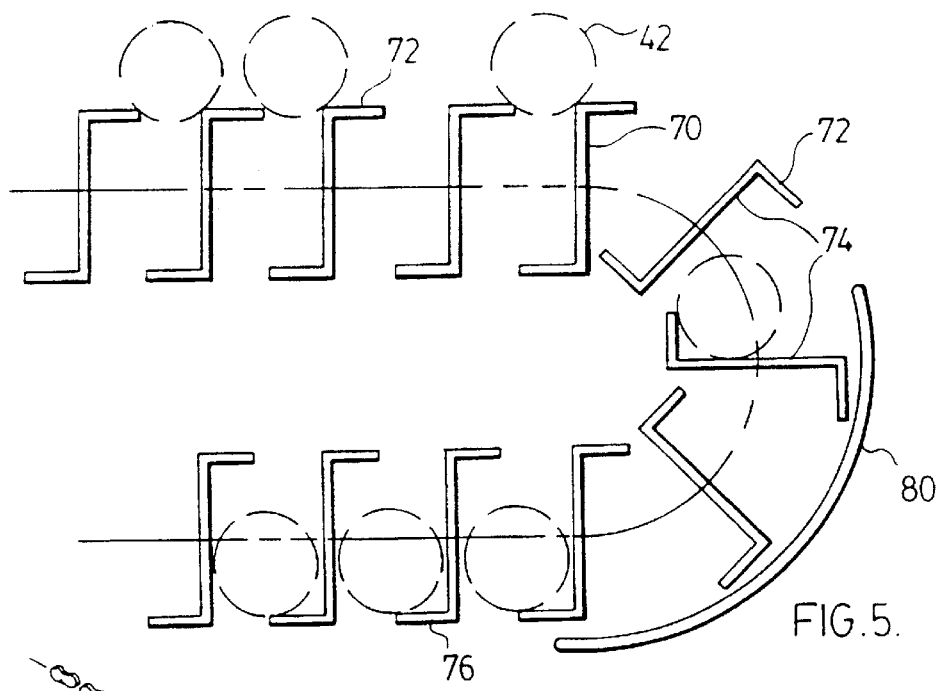
FIG. 5 is a schematic side elevation of another embodiment of paddle showing an end plate to retain like objects within the conveyor.

With reference to FIG. 5, a Z-shaped paddle 70 is shown supporting eggs 42 on upper flange 72. Upon downturn of the conveyor, the eggs 42 descend into the cavity defined between webs 74 for support by lower flange 76. An arcuate plate 80 restrains eggs 42 from discharge.

Figure 6:
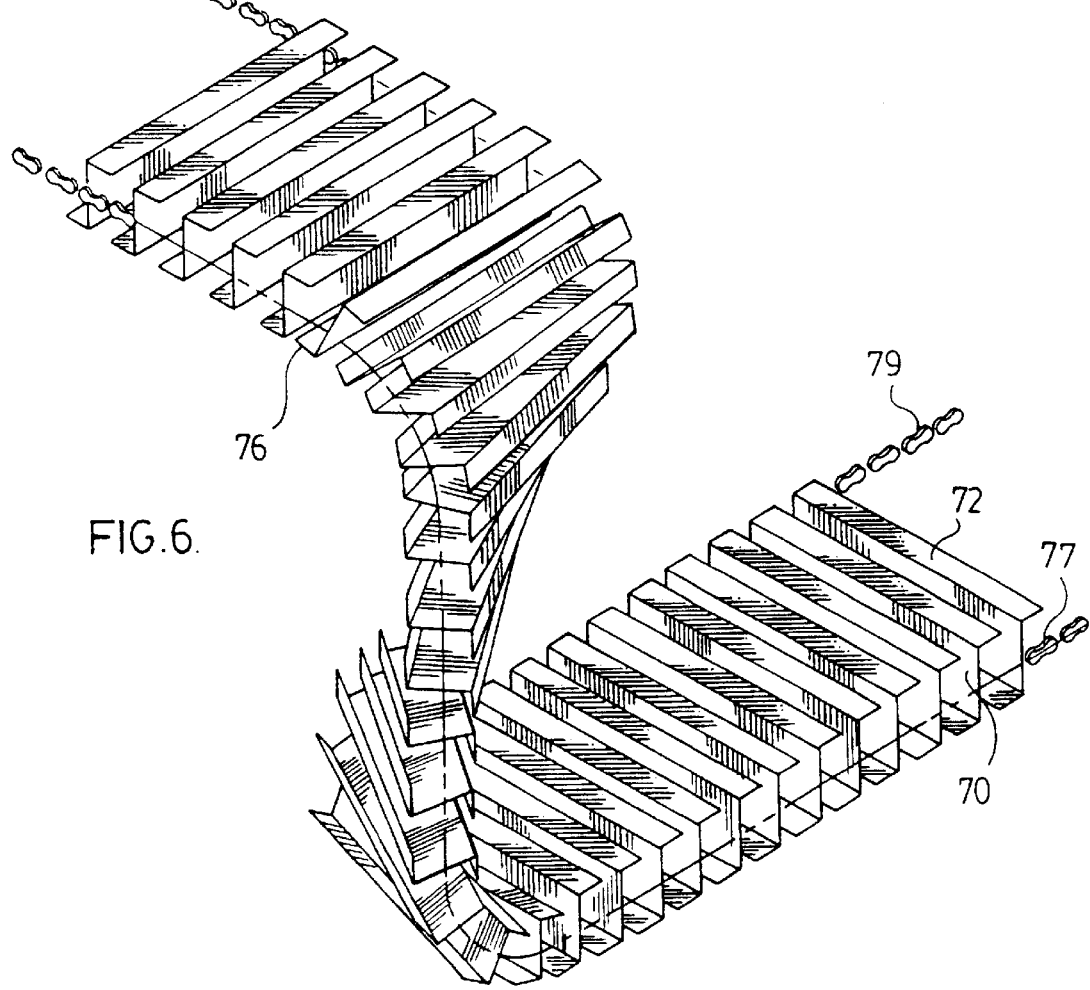
FIG. 6 is a perspective schematic view of the embodiment illustrated in FIG. 5 travelling vertically downwardly with a right angle change in direction of travel.

FIG. 6 schematically illustrates the embodiment of FIG. 5 in a descending helical turn of 90° for a change of direction with lowering of the eggs from an upper level to a lower level, parallel chains 77, 79 passing over sprocket wheels, not shown, for controlled change of direction.

Figure 7:
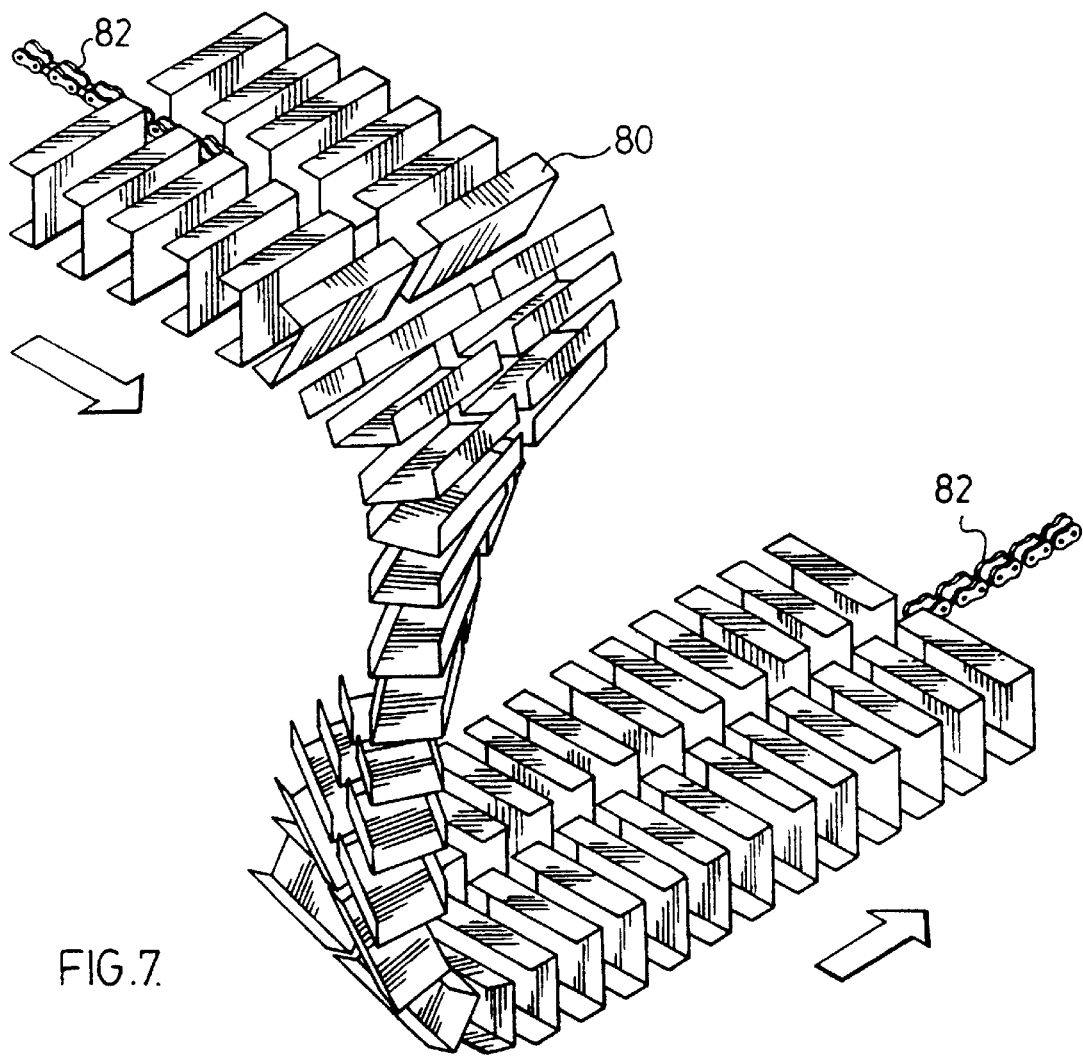
FIG. 7 is a perspective schematic view of the embodiment illustrated in FIG. 8 actuated by a single, central endless chain travelling vertically downwardly with a right angle change in direction of travel.

FIG. 7 illustrates another embodiment of C-shaped paddle 80 driven by a single central chain 82 in a descending helical turn of 90° for a change of direction with a change of height.

Figure 8:
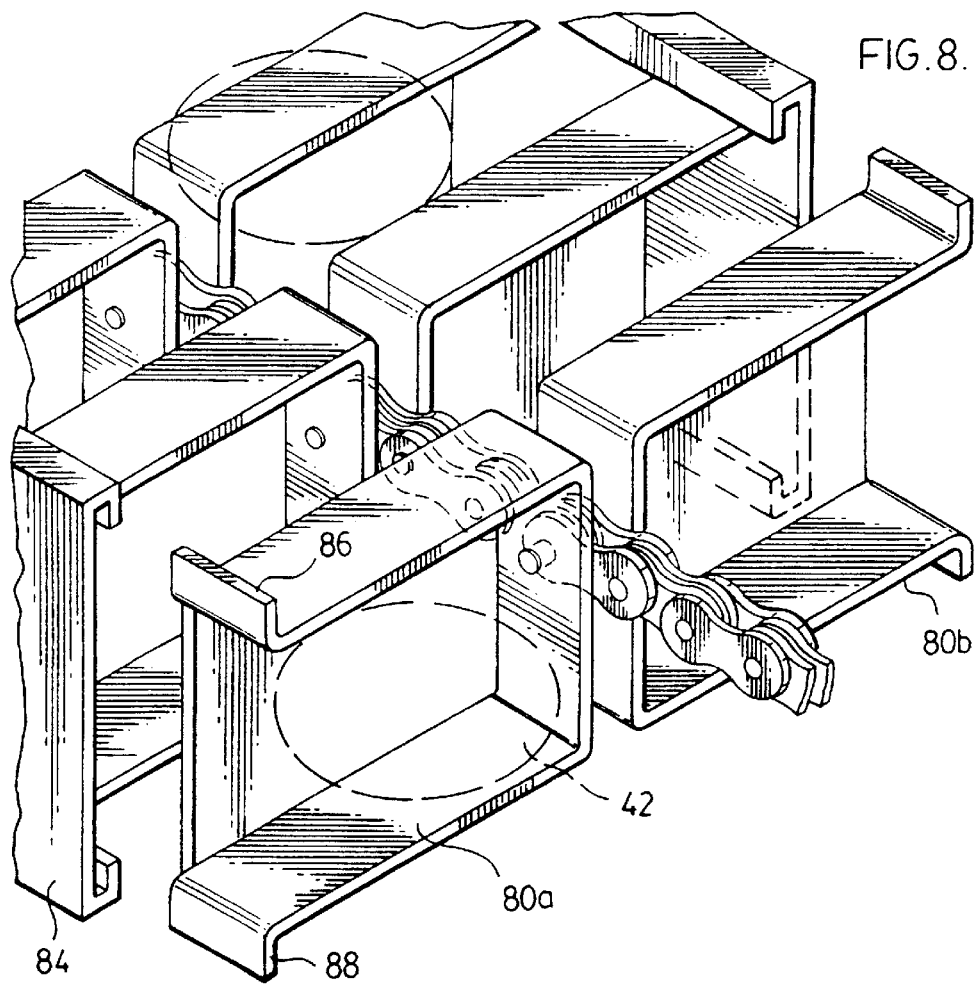
FIG. 8 is a perspective view of a C-section with a central chain drive in linear travel.

The C-shaped paddle 80 of FIG. 7 is illustrated in more detail in FIG. 8 in which chain 82 is rivetted to opposed paddles 80a and 80b. An end closure guide 84 slidably receives flanges 86, 88 at the open end of the paddles to restrain eggs 42 within the paddles and to guide the paddles through helical upward or downward turns.

Figure 9:
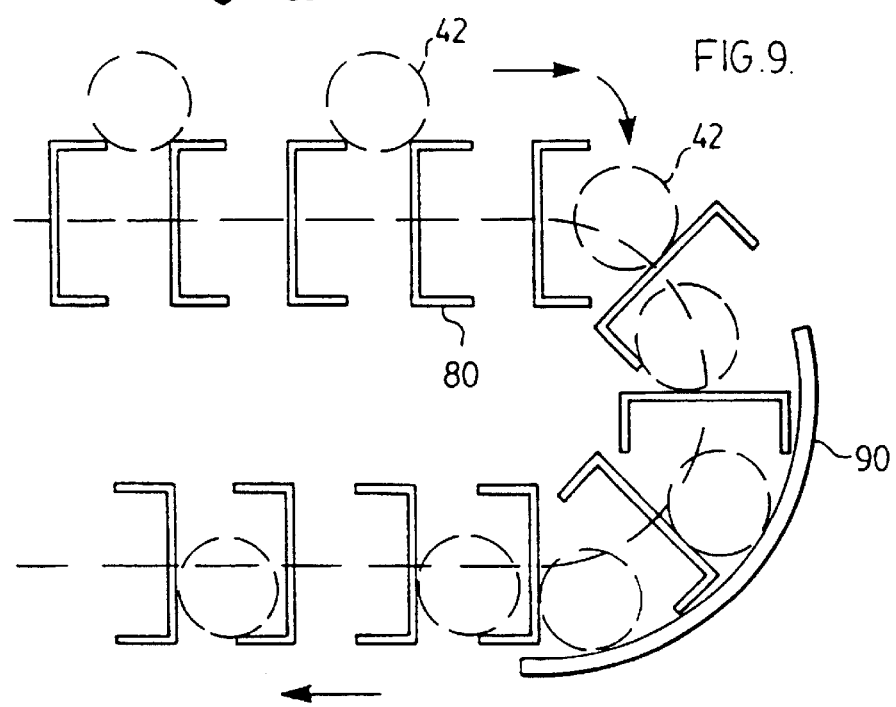
FIG. 9 is a schematic side elevation of the embodiment illustrated in FIG. 8 illustrating the C-section paddle turning downwardly from horizontal, linear travel downwardly through 180° arcuate travel to horizontal linear travel in the opposite direction, with an end plate for retaining like objects within the C-shaped section.

FIG. 9 shows a C-shaped paddle supporting eggs 42 during horizontal linear travel and entry of eggs during initiation of downward arcuate travel. Eggs 42 are restrained within the paddles by end plate 90 during downward arcuate travel.

Figure 10:
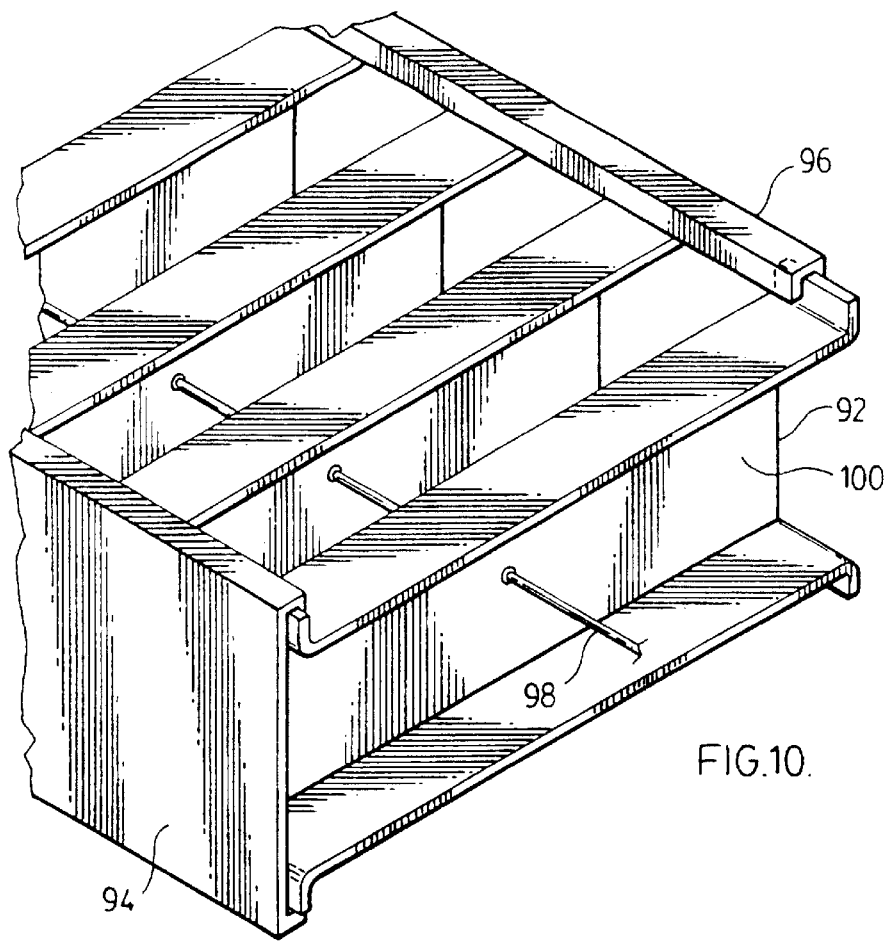
FIG. 10 is a perspective view of a further embodiment of C-shaped section driven by a central cable and guided by side closure plates.
Figure 11:
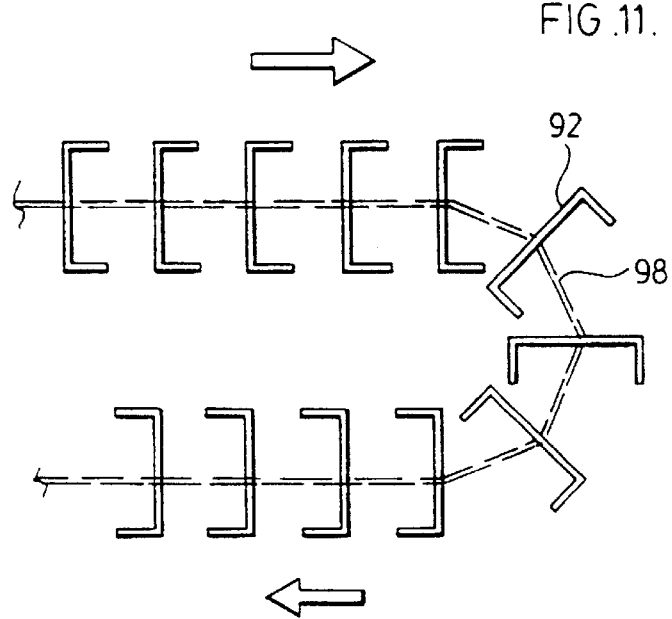
FIG. 11 is a schematic side elevation of the embodiment illustrated in FIG. 10 illustrating horizontal travel downwardly through 180° arcuate travel to opposite horizontal linear travel.

FIGS. 10 and 11 illustrate another embodiment of C-paddle 92 guided by closure guide plates 94, 96 and advanced for continuous travel by cable 98 secured to the web 100 of each paddle. Cable 98 also functions as a divider to separate the C-paddle into two compartments. Separation means such as partitions can be secured to web 100 to divide each paddle into two or more compartments. Partitions can be moveable between a narrow spacing, used for transporting eggs in the conveyor and escalator system, to a wider spaced position for orienting eggs according to the egg packer apparatus described and illustrated in U.S. Pat. No. 5,365,717. Partitions also can be staggered to permit feeding of eggs to the above-mentioned packer apparatus.

Figure 12:
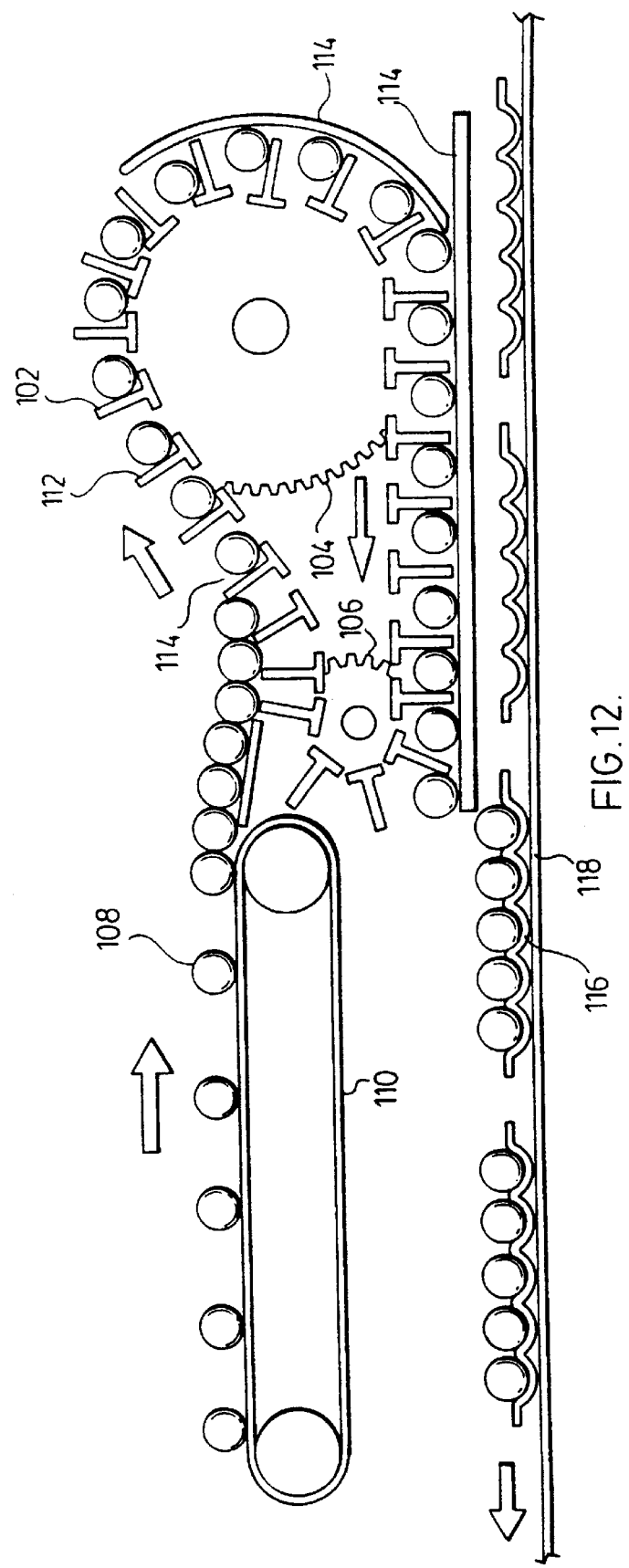
FIG. 12 is a schematic side elevation of a still further embodiment of the present invention showing inverted T-sections for receiving like objects and transferring said like objects into cartons.

FIG. 12 illustrates an inverted T paddle conveyor having equispaced T-shaped paddles 102 interconnected by a chain, cable or belt, preferably a chain as depicted by the sprocket wheels 104, 106, for transferring objects 108 such as golf balls or eggs from conveyor 110 onto the upstanding stems 112 of the T-paddles and into cavities 114 between stems 112 upon the T-shaped paddles straightening into linear travel and then into an arcuate outside turn. Semi-cylindrical plate 114 restrains objects 108 until the paddles reach planar base 114, at which time the paddles advance objects 108 into packing trays 116 on conveyor 118.

Figure 13:
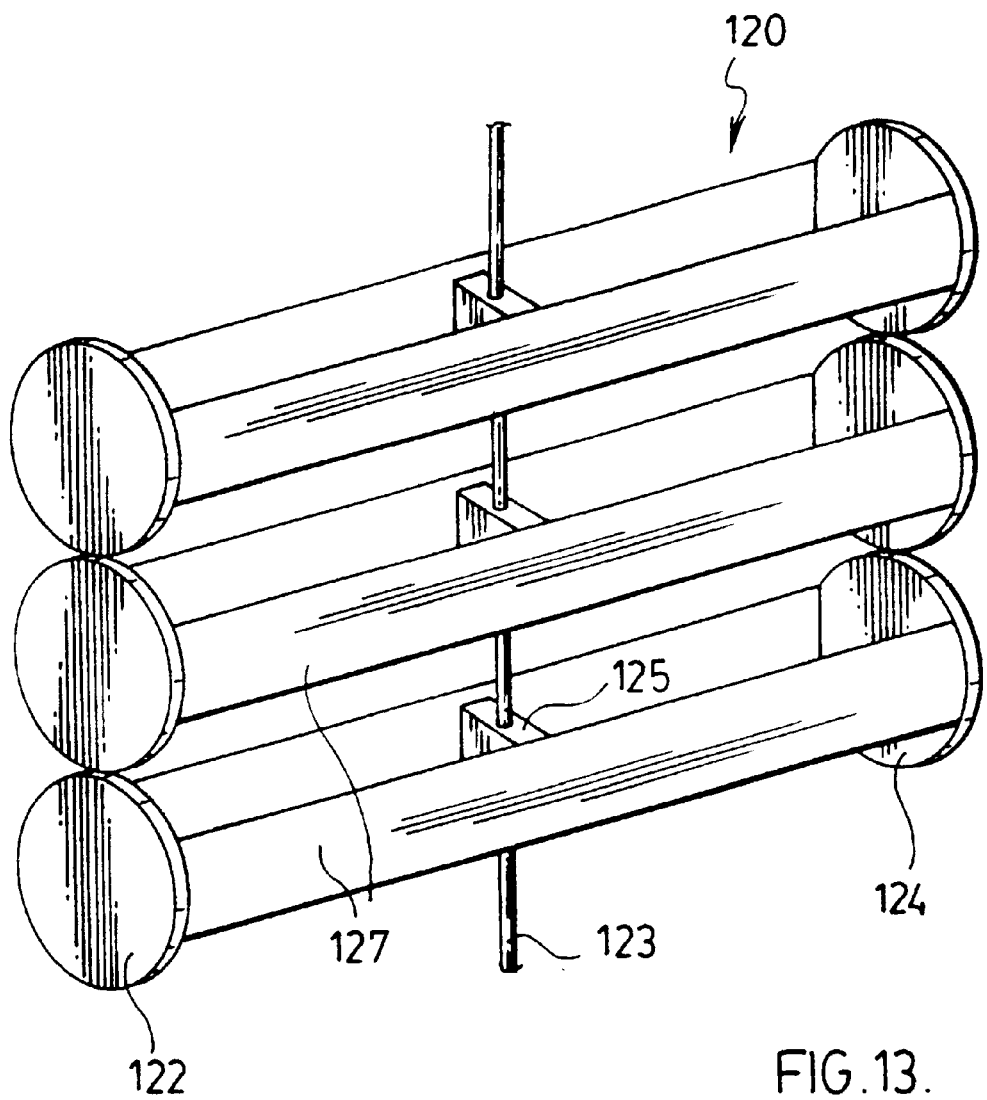
FIG. 13 is a schematic perspective view of another embodiment of the invention.

FIG. 13 illustrates an embodiment of C-shaped paddle 120 having circular end plates 122, 124 at opposite ends thereof for uniform parallel spacing of adjacent paddles during linear and arcuate vertical travel and during upward or downward helical travel for concurrent change of direction and height. Cable 123 with divider 125 separate the paddle cavity into a pair of compartments. Flanges 127 are spaced sufficiently close to each other to support eggs when the conveyor is in linear travel and are urged apart during arcuate travel to receive an egg therebetween.

Figure 14:
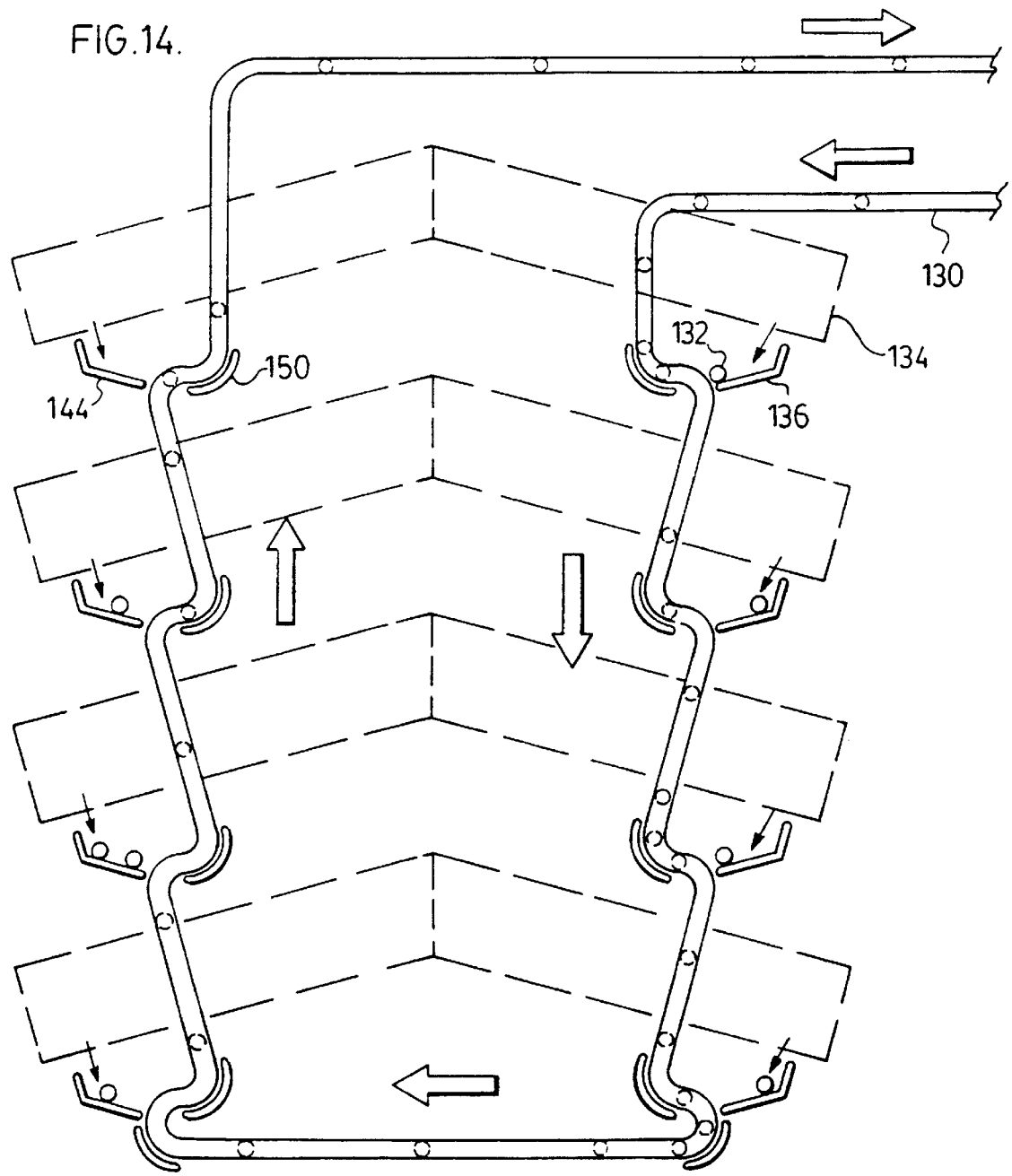
FIG. 14 is a vertical schematic view illustrating an egg collecting and elevating system of the present invention.

FIG. 14 typifies an egg collection system utilizing the conveyor and escalator of the invention in which conveyor 130 receives eggs 132 from a plurality of egg laying levels typified by level 134 and ramp 136. Eggs are received at upward and downward outer turns as illustrated more clearly in FIG. 16 for an upward arcuate turn.

Figure 16:
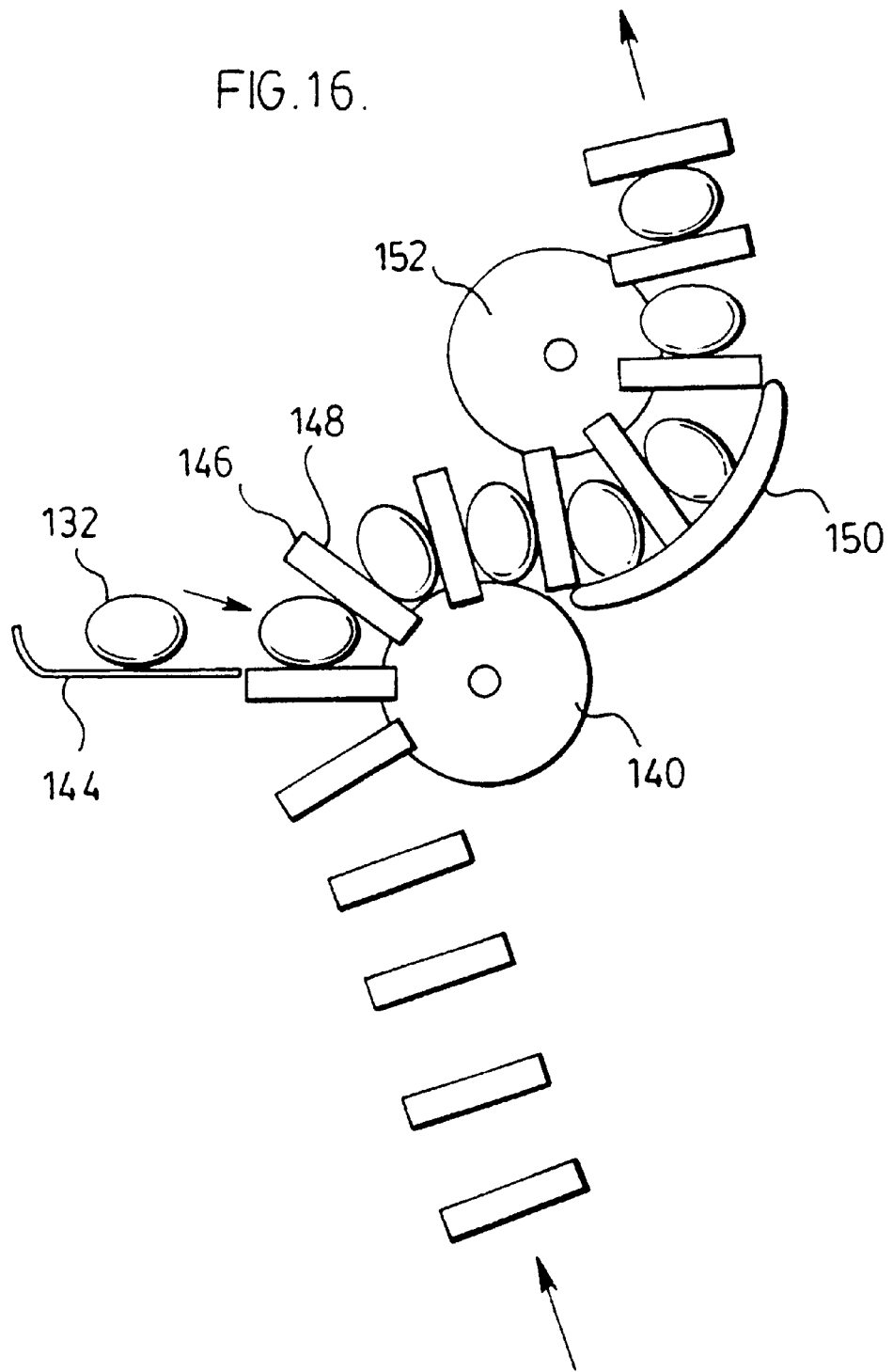
FIG. 16 is a schematic side elevation of a portion of the system shown in FIG. 14.

With particular reference to FIG. 16, as the chains travel upwardly through an outside turn about sprocket 140, an egg 142 on ramp or belt conveyor 144 rolls between the outer flange 146 of paddles 148 as the upper flanges are urged apart. Plate 150 retains eggs 142 between the paddles as they travel about sprocket 152. The eggs are collected by several vertical combinations of sprockets 140, 152 as the conveyor rises at the ends of the cage rows between the egg belts 144.

Figure 15:
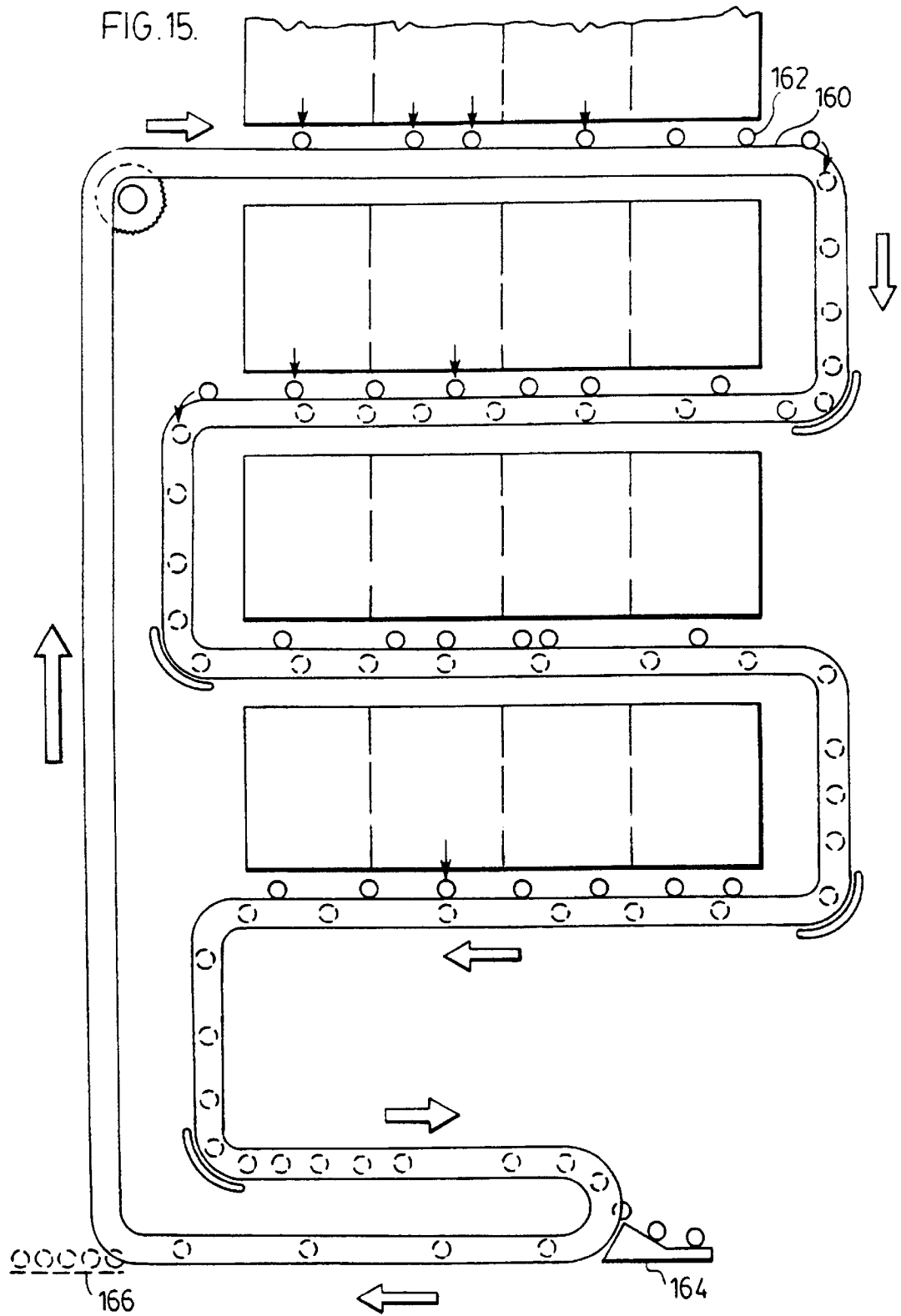
FIG. 15 is a vertical schematic view of a further system of the present invention.

FIG. 15 shows an embodiment of egg conveyor and escalator system in which conveyor 160 passes alternatively back and forth beneath vertical levels of egg laying roosts. Eggs 162 ride on the upper flanges of the paddles until downward arcuate turns are reached, at which time the paddles open as discussed above to receive the eggs or like objects in the cavities between the paddles. The objects are conveyed to a discharge ramp 164 for egress from the system, or can be carried to a packing table 166 shown by ghost lines.

Figure 17:
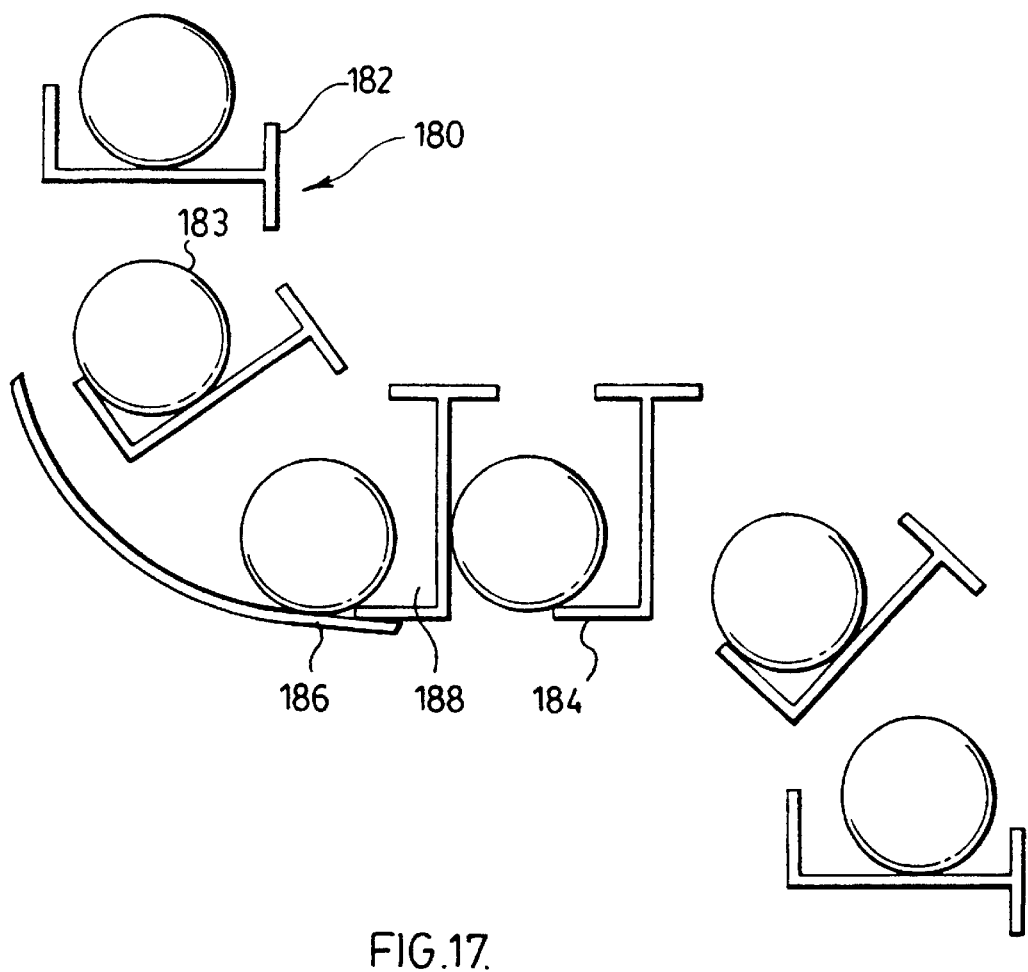
FIG. 17 is a schematic elevation view of a J-shaped paddle of the invention.

FIG. 17 illustrates a J-shaped paddle 180 embodiment in which upper flanges 182 support eggs or the like objects 183 during horizontal linear travel and bottom flange 184 supports objects 183 during arcuate travel, in combination with semi-circular plate 186, or during horizontal linear travel when the object is contained within the cavity 188.

I claim:

1. A conveyor and escalator for transporting objects having a substantially uniform size and length comprising a pair of parallel spaced-apart endless chains and at least two linearly-spaced sprocket wheels engaging each said endless chain for supporting said chain in linear travel between the sprocket wheels and in arcuate travel about said sprocket wheels, and means for rotating said sprocket wheels for advancing the endless chains in a direction of advance, a plurality of equispaced elongated paddles attached substantially perpendicular to said chains for defining a receiving volume therebetween which closes during linear travel to contain an object in the receiving volume or support the object on the paddles, and which opens during arcuate travel to receive or release an object contained in the receiving volume or supported on the paddles, each paddle comprising an elongated web having longitudinal side edges and an arcuate flange having a concave inner face attached centrally along said concave face to each longitudinal edge of the web to form an I-section having a longitudinal central axis, an end plate having a pair of upstanding spaced-apart fingers located at each end of the paddle adapted to receive the paddle web therebetween and to engage the concave inner face of the adjacent arcuate flange, and means formed centrally on the end plates for removably rigidly connecting each of the end plates transversely to the endless chains perpendicular thereto, whereby the paddles remain vertically upright during horizontal linear travel to support objects on adjacent upper flanges and whereby the paddles pivot relative to each other about said longitudinal central axis during arcuate travel to open adjacent paddles at the upper flanges to receive objects therebetween during upward or downward arcuate travel and to open adjacent paddles at adjacent lower flanges to receive or discharge objects therefrom during upward or downward arcuate travel.

* * * * *